United States Patent [19]

Christopher et al.

[11] 3,759,326

[45] Sept. 18, 1973

[54] SECONDARY OIL RECOVERY METHOD

[75] Inventors: Charles A. Christopher, Houston; Joseph C. Allen, Bellaire, both of Tex.; Jack H. Kolaian, Wappingers Falls, N.Y.

[73] Assignee: Texaco Inc., New York, N.Y.

[22] Filed: Mar. 29, 1972

[21] Appl. No.: 239,387

[52] U.S. Cl. .............................. 166/275, 166/274
[51] Int. Cl. .................................... E21b 43/22
[58] Field of Search ............... 166/275, 273, 274, 166/292, 293; 252/8.55 D

[56] References Cited
UNITED STATES PATENTS

| | | | |
|---|---|---|---|
| 2,816,610 | 12/1957 | Fisher | 166/274 |
| 2,920,041 | 1/1960 | Meadors | 166/275 |
| 3,070,161 | 12/1962 | Kerver et al. | 166/292 X |
| 3,167,118 | 1/1965 | Habermann | 166/273 X |
| 3,326,287 | 6/1967 | Corrin | 166/274 X |
| 3,368,620 | 2/1968 | Harvey | 166/274 |
| 3,375,872 | 4/1968 | McLaughlin et al. | 166/292 |
| 3,412,792 | 11/1968 | Parker et al. | 166/274 |
| 3,476,187 | 11/1969 | Harvey | 166/275 X |
| 3,515,216 | 6/1970 | Gies | 166/292 X |
| 3,566,967 | 3/1971 | Shelton | 166/292 X |

*Primary Examiner*—Stephen J. Novosad
*Attorney*—Thomas H. Whaley et al.

[57] ABSTRACT

A method for the production of hydrocarbons from subterranean reservoirs which comprises having at least one production well and one injection well penetrating the reservoir and injecting a fluid into the injection well to drive the hydrocarbons to the production well. The fluid comprises an intimate mixture of colloidal silica and a material which is miscible with the hydrocarbons in the reservoir.

8 Claims, No Drawings

SECONDARY OIL RECOVERY METHOD

BACKGROUND OF THE INVENTION

In a hydrocarbon (oil) reservoir which has been produced to the point that it is depleted in natural energy; it is often desirable to institute secondary recovery methods to recover the large amount of oil still left in the reservoir. Most secondary recovery operations are generally carried out by injecting an extraneous fluid into the reservoir which will then migrate to an output well driving the oil ahead of it. The oil is recovered at the output well. Even in secondary recovery operations about one-half of the oil is left behind in the reservoir. The inefficiency of the displacement process is due to two retentive forces, viscosity and capillarity. The retentive force of viscosity may be removed by heating the formation to a point where the viscosity of the reservoir becomes equal to or less than the viscosity of the displacing fluid or by increasing the viscosity of the displacing fluid. However, if the displacing fluid is not miscible with the oil, the retentive force of capillarity will not be removed. To remove the retentive force of capillarity it is necessary to use as a displacing fluid a material which is miscible with the oil. If the displacing fluid is miscible with the reservoir oil the interface between the oil and displacing fluid will be removed and, therefore, so will the retentive force of capillarity.

Displacement efficiency is a term referring to the amount of oil removed from the portion of the reservoir actually swept by the displacing fluid. Displacement efficiency may be low due to high surface tension at the interface between the displacing fluid and the oil in the reservoir. If this surface tension can be removed the capillary forces will be reduced to zero and the oil may be completely displaced from the portions of the reservoir contacted by the displacing fluid.

Sweep efficiency is a term referring to the percentage of the reservoir actually contacted or swept by the displacing fluid regardless of the amount of oil removed from the swept portion or displacement efficiency.

Although miscible fluid displacement provides high oil recovery from the area of the reservoir acutally swept or contacted by the miscible fluid (high displacement efficiency), much difficulty has been experienced in obtaining a satisfactory sweep efficiency of the reservoir due to viscosity effects. The poor sweep efficiency of the displacement fluid has been found to be related to high mobility ratios between the displacement fluid and the oil. The mobility ratio is defined by the following equation:

$$M = (K_2/u_2)/(K_1/u_1)$$

where $M$ = mobility ratio $u_2$, $u_1$ = viscosity of displacing fluid and displaced fluid (oil), respectively:

$K_2$, $K_1$ = permeability of the formation with respect to the displacing fluid and the displaced fluid respectively.

At high mobility ratios a phenomenon commonly known as fingering occurs. The displacing fluid does not display a flat front to the reservoir oil, but instead, rushes ahead at various points in finger like protrusions. The oil in areas not touched by the "fingers" of displacing fluid are usually left unrecovered in pockets in the reservoir. The preceeding equation shows that the mobility ratio and the degree of fingering is directly proportional to the ratio of the displaced fluid viscosity to the displacing fluid viscosity, $u_1/u_2$. Since most displacing fluids are less viscous than the displaced fluid, oil, the mobility ratio will usually be quite high, and a poor sweep efficiency will occur becuase of fingering.

As stated in the *Reservoir Engineering Manual* by Frank W. Cole, Gulf Publishing Co., 1969, at page 230:

"The capillary forces holding the oil in the reservoir rocks can be eliminated if an injection fluid is used which is miscible with the reservoir oil.

"Although these miscible fluids will displace 100 percent of the oil which they contact, recovery is actually substantially less becuase of the low viscosity and low density of the injected fluid. The low viscosity causes channeling and bypassing, and the low density promotes gravity segregation and consequent over-running of the oil. Becuase of these two factors, this method works best in low viscosity, high API gravity oil reservoirs."

Polymeric compounds which increase the viscosity of the displacing fluid so as to lower the mobility ratio and increase the sweep efficiency of the displacing fluid have been developed and used in recent years. For example, U. S. Pat. No. 3,039,529 discloses the use of polyarylamide solutions to increase the viscosity of the displacing fluid. Also, U. S. Pat. No. 3,581,824 discloses the use of polysaccharides for the same purpose. Although these polymers are useful for increasing the viscosity of the displacing fluid they are expensive. Also, the displacing fluid containing these polymers tends to decrease viscosity as it travels through the reservoir away from the injection well bore. This, of course, causes the mobility ratio to rise and increases the likelihood that fingering will occur.

The method of our invention solves these problems by providing an injection fluid which will not decrease in viscosity as it moves away from the injection well bore.

The method of this invention also provides an injection fluid which is miscible with the reservoir oil while having a high enough viscosity so that the mobility ratio will be low enough to retard fingering.

The method of our invention also provides a method of secondary recovery of oil from subterranean reservoirs which overcomes both the retentive forces of viscosity and capillarity.

SUMMARY OF THE INVENTION

The invention is a method for recovering oil from subterranean oil reservoirs which is penetrated by at least one injection well and at least one production well wherein a fluid is injected into the injection well and oil is produced from the production well. The fluid comprises an intimate mixture of a hydrocarbon miscible with reservoir oil and colloidal silica.

DESCRIPTION OF THE PREFERRED EMBODIMENTS

THE FLUID

The preferred injection fluid useful in the process of our invention comprises an intimate mixture of a hydrocarbon miscible with the reservoir oil and colloidal silica.

The hydrocarbon component of the injection fluid of our invention must be a solvent for the reservoir oil, that is, it must be miscible with the reservoir oil. Examples of suitable hydrocarbons are LPG, propane, butane, isobutane, pentane, isopentane, hexane, gas condensate, crude oil or any petroleum distillates which are miscible with the reservoir oil.

The colloidal silica useful in our invention is different from precipitated silica or silica gel. The colloidal silica useful in our invention is a fumed silica which is made up of chain-like formations sintered together. These chains are branched and have enormous external surface areas of from about 50 to about 400 meters$^2$/gram. Each segment in the chain has many hydroxyl (OH) groups attached to silicon atoms at the surface. When the segments come into proximity to each other, these hydroxy groups will bond to each other by hydrogen bonding to form a three dimensional network.

The colloidal silica acceptable for use in the method of this invention should have a particle size ranging from about 7 to 15 millimicrons (m$\mu$). In this size range the colloidal silica will pass through even reservoirs with very small pore size. For example, a reservoir having very low permeability of say 0.016 millidarcies (md) has a correspondingly small pore size of 25 to 100 m$\mu$. Thus, the colloidal silica suitable for use in the process of this invention will pass through even the smallest pores encountered in hydrocarbon reservoirs and will maintain a constant viscosity in the displacing fluid.

Colloidal silicas are readily available from manufacturers. One source is the Cabot Corporation of Boston, Massachusetts under the trade name CAB-O-SIL. Colloidal silica is also available from other commerical sources and the reference to one source is not intended to limit the scope of our invention.

When the silica particles are dispersed in a liquid medium, the network structure formed by the silica particles restricts the movement of the molecules of the liquid medium. This results in an increase in the viscosity of the liquid.

The thickening efficiency of the silica is directly related to the polarity of the liquid to be thickened. The use of selected additives (surfactants and/or multifunctional compounds) can increase the thickening efficiency of the silica. In the case of the hydrocarbon solvent mentioned above, these additives react with the interface between the silica and the solvent and increase the degree to which the silica particles form the three dimensional network. This allows less silica to be used to achieve equivalent thickening of the solvent. Usually less than 0.5 percent of the additive based on the weight of total liquid to be thickened will achieve marked increases in viscosity.

For liquids of high polarity such as water, aldehydes, ketones, etc., cationic and nonionic surfactants e.g., oleoyl trimethylene diamine and nonyl polyethoxy ethanols can cause dramatic increases in viscosity. Low polarity or non-polar liquids, such as hydrocarbons, are thickened by the use of anionic surfactants such as sodium linear allylate sulfonate and multifunctional compounds such as ethylene glycol.

Depending on the system, dramatic changes in viscosity can occur by using two additives such as a non-ionic surfactant, and a cationic type.

The surfactant which may be used in the injection fluid of our invention may broadly be any compound which reduces surface tension of the water, thus reducing the surface tension between the water and the reservoir oil. Soap may be used, for instance, the sodium salts of high molecular weight alkyl sulfates or sulfonates. Also very useful are nonionic surfactants which are usually a reaction product of a hydrophobic and a hydrophilic material, such as the reaction product between mono-alkyl phenols and ethylene oxide.

The multifunctional compounds mentioned above fall inot the general class of compounds with a plurality of groups available for hydrogen bonding. Examples of such compounds are amines, ethylene glycol, glycerine, and propylene glycol.

The fluid of our invention should be adjusted in viscosity so that the mobility ratio is not less than about 0.1 nor more than about 10. At the higher mobility ratios fingering will have more of a tendency to occur and at the lower mobility ratios the fluid will become progressively more viscous and difficult to pump. It is especially preferred that the mobility ratio range from about 0.9 to about 3.

Of course, once the desired mobility ratio is known, the necessary viscosity of the fluid may easily be calculated. The viscosity of the fluid described in our invention may be tailored to fit the needs of the user by variations of ingredients. In general an increase in the proportion of hydrocarbon solvent will cause a decrease in viscosity.

USE OF THE FLUID

A soft gel of the hydrocarbon solvent to be used may be prepared containing the hydrocarbon and colloidal silica. The gel may be reduced in viscosity by adding additional hydrocarbon solvent. The gel may be increased in viscosity by adding polar multifunctional compound and/or a surfactant.

The fluid of this invention is then injected into the reservoir in order to displace the oil in the reservoir to production wells. The fluid of our invention may conceivably be the only fluid injected into the formation but considering its relatively expensive character and the vast quantities which would be needed to flood an entire oil reservoir, it is preferred to use the fluid of our invention as a slug. A slug of the fluid of our invention would be injected into the reservoir followed by another fluid. The trailing fluid may be water, gas or some treated fluid.

The thickened miscible slug of our invention may be used according to standard methods of miscible slug displacement. The lower mobility of the miscible slug of our invention will remove problems of fingering and overriding encountered with conventional miscible fluids. It is within the skill of the art to determine the proper slug size and rate of displacement to be used. As is known by those skilled in the art there is considerable controversy over the size of miscible slug which should be used. A standard text: *Mechanics of Secondary Oil Recovery*, Smith, Reinhold, New York, 1966, provides much basic information on miscible displacement.

The fluid of this invention provides an improvement over the polymer thickened fluids in shear resistance. When polymer thickened fluids are subjected to the tremendous shear forces present as they are pushed through the reservoir rock they lose viscosity, particularly in the vicinity of the well bore, and the mobility ratio rise results in possible fingering effects. However, the fluid of our invention does not lose appreciable viscosity due to shear forces.

Injection of the fluid of this invention may be in a secondary recovery operation or in a tertiary recovery operation. For example, after a conventional water flood or polymer flood or any other secondary recovery operation the fluid of this invention may be injected to remove additional hydrocarbons.

Experimental

A fluid suitable for the method of our invention was prepared as follows: 200 milliliters (ml) of n-hexane and 4 grams (g) of colloidal silica were mixed in a waring blender for 1 minute at 16,000 revolutions per minute. A soft gel formed.

This gel could have been reduced in viscosity by adding more n-hexane but the effects of other additives were investigated as follows: To the soft gel above, 3 ml of nonionic surfactant, 3 ml glycerine nad 20 ml water were added with blending. A firm gel formed. To this firm gel 1000 ml n-hexane and 210 ml of water were added with blending. The viscosity of the resulting mixture was 160 cp and has remained stable for about a year.

We claim:

1. A method for recovering hydrocarbons from subterranean hydrocarbon bearing reservoirs comprising:
   a. penetrating the reservoir with at least one injection well and one production well which are in fluid communication with the reservoir and
   b. injecting into the injection well a thickened fluid comprising an intimate mixture of colloidal silica and a hydrocarbon solvent miscible with the reservoir hydrocarbon and
   c. producing hydrocarbons from the production well.

2. A method as in claim 1 wherein the injected fluid is injected as a slug.

3. A method as in claim 1 wherein the mobility ratio between the injected fluid and the reservior hydrocarbon is from about 0.1 to about 10.

4. A method as in claim 3 wherein the mobility ratio is from about 0.9 to about 3.

5. In a method for recovering hydrocarbons from subterranean hydrocarbon bearing reservoirs wherein at least one injection well and one production well are in fluid communication with said reservoir and an injection fluid is injected into the injection well and hydrocarbons are produced from the production well the improvement which comprises:

injecting a thickened fluid comprising an intimate mixture of colloidal silica and a hydrocarbon solvent miscible with the reservoir hydrocarbons.

6. A method as in claim 5 wherein the fluid is injected as a slug.

7. A method as in claim 5 wherein the mobility ratio between the injected fluid and the reservoir hydrocarbon is from about 0.1 to about 10.

8. A method as in claim 7 wherein the mobility ratio is from about 0.9 to 3.0.

* * * * *